T. C. FUQUA.
ICE CREAM DIPPER.
APPLICATION FILED AUG. 20, 1913.
1,121,489. Patented Dec. 15, 1914.
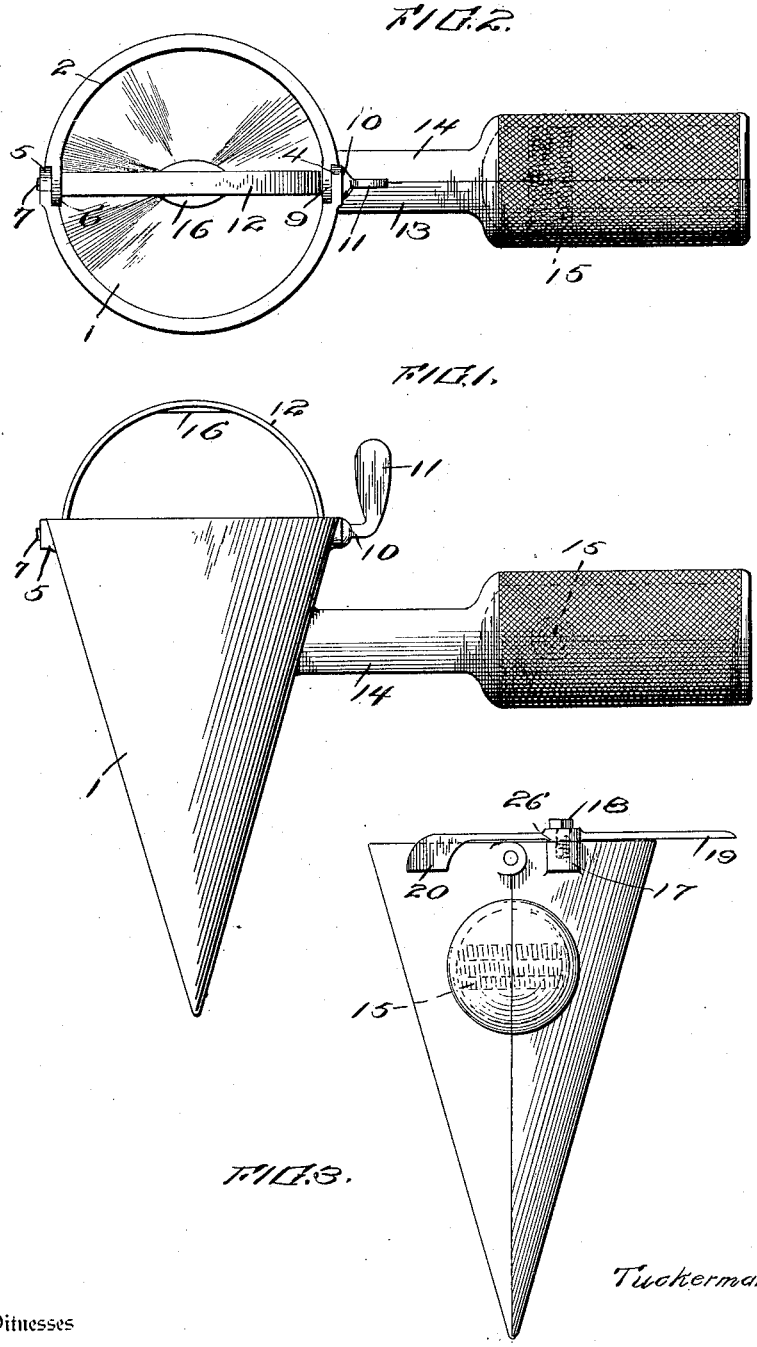

UNITED STATES PATENT OFFICE.

TUCKERMAN C. FUQUA, OF RICHMOND, VIRGINIA.

ICE-CREAM DIPPER.

1,121,489.  Specification of Letters Patent.  Patented Dec. 15, 1914.

Application filed August 20, 1913. Serial No. 785,805.

*To all whom it may concern:*

Be it known that I, TUCKERMAN C. FUQUA, a citizen of the United States, residing at Richmond, in the county of Henrico and State of Virginia, have invented certain new and useful Improvements in Ice-Cream Dippers; and I do hereby declare the following to be a full, clear, and exact description of the invention, such as will enable others skilled in the art to which it appertains to make and use the same.

This invention relates to ice cream dippers and an object of the invention is to provide a conical dipper open at the apex for the purpose of discharging into a cone ice cream which has previously been formed so as to fit snugly within the cone.

A further object of the invention is to provide improved means for hinging the sections of the dipper in such a way as to make possible the use of a simple handle.

A still further object of the invention is to provide a two-part ice cream dipper opening at the apex with an arcuate cutter pivoted in the mouth of the dipper for the purpose of rounding the surface of the cream or giving it other desired surfaces.

A still further object of the invention is to provide an ice cream dipper opening at the apex of a conical member with a resilient cutter the central portion of which can be enlarged to form a thumb-piece for the purpose of loosing the cream from the sides of the dipper should the cream stick.

With these and other objects in view, the invention comprises certain novel constructions, combinations and arrangements of parts as will be hereinafter more fully described and claimed.

In the drawings where similar reference characters designate corresponding parts, Figure 1 is a side elevation of my invention, Fig. 2 is a top plan view, Fig. 3 is an end view looking toward the handle of an embodiment of the invention using a cutter which cuts the ice cream in a plane practically coincident to the plane of the mouth of the dipper.

The general aim of this invention is to provide an ice cream dipper composed of two hemiconic sections which are pivoted together at two points to form a mouth which receives the cream. Extending from each of said sections is a handle and there is pivoted between the handles of the two sections, a resilient member sufficiently strong to force the apices of the sections of the dipper apart when pressure is released by the attendant or user. Any form of cutter may be used for finishing the top of the cream.

Referring more particularly to the drawings, it will be seen that the dipper is formed of two hemiconic sections 1 and 2 which may be made of any suitable material such as aluminum and are hinged as at 3 and 4 so that the edges of said sections can be brought together to form a complete cone. The manner of forming the hinge as shown in Fig. 2 is to provide the extension 5 of the section 2 with a reduced end which coöperates with the corresponding reduced end 6 of section 1, there being a bolt or other pivot member 7 passing through the reduced ends 5 and 6. An additional pivot for the two sections is provided by forming upon the opposite side of the mouth of the dipper, corresponding reduced portions 8 and 9 formed on the sections 2 and 1 respectively, the pivot or bolt in this case being replaced by the projecting end 10 of a handle 11 which is rigidly connected with one end of the arcuate cutter 12 while the other end of the arcuate cutter 12 is pivotally mounted upon the bolt 7. By referring to Fig. 3, it will be seen that the portions of the mouth of the cone which receive the pivots are somewhat thicker than the remaining portions of the sections of the cone and that the ends of the arcuate cutter 12 are mounted adjacent the enlarged portions of the dipper so that when the dipper is to be used, the cutter 12 may be housed within the mouth of the dipper as shown at Fig. 2. As shown in dotted lines in Fig. 1, the enlarged portions of the dipper already referred to may be tapered off and vanish in the sides of the hemiconic sections.

The sections 1 and 2 have extending therefrom complementary handles 13 and 14 respectively the outer ends of which may be enlarged to form a housing for a spring 15 which normally acts to separate the handles. As shown in Fig. 1, it is desirable to have the point at which these handles 13 and 14 are attached to their respective sections of the dipper removed from the line passing through the axis or pivotal points about which the dipper sections rotate.

When it is desired to use the dipper disclosed herein, the cutter 12 will be thrown to the position shown in Fig. 2 by means of the handle 11, after which the user may grasp the handles 13 and 14 and close the same against the resilience of the spring 15 so that the sides of the dipper are closed to prevent oozing of the cream through the adjacent edges. The dipper may then be filled, after which by a movement of the thumb, the handle 11 can be rotated to force the cutter 12 from the top of the cream to give a finished surface thereto. By releasing the handle sections 13 and 14, the spring 15 will force the sections of the dipper apart after which the cream can be made to fall into a cake cone suitably placed beneath the dipper. If any difficulty is experienced in dislodging the cream from one of the sections of the dipper, the top central portion of the cutter 12 may be provided with a large thumb-piece 16 which may be depressed for the purpose of loosing the cream from the section of the cone to which it adheres. When the thumb-piece 16 is used, it will be desirable to make the cutter 12 of resilient material, but when the thumb-piece is not used, the cutter 12 may or may not be made of resilient material.

It will be noted that in the form of the invention shown in Fig. 1, the rounded portion of the cream is formed by the cutter 12 which is made concentric with the mouth of the dipper but of a radius somewhat less than the inner radius of the mouth of the dipper so that as the hinged sections of the dipper rotate about their pivots, the upper rounded portion of the cream will slide therethrough without interference. It will further be noted that inasmuch as the hemiconic sections are pivoted in two points, a proper lever action will be obtained inasmuch as the handle is secured to the sections at a point removed from the line joining the pivots. Cone formers of the general type disclosed herein have been proposed, but such formers have usually had the component sections pivoted at one point only so that it has been necessary to provide handles of extraordinary design and to provide means for preventing distortion of the dipper when pressure was brought to bear upon the sections thereof through the handle. The present invention overcomes this difficulty by providing two pivots and a handle of simple construction.

If desired, one of the sections of the cone may have formed thereon a boss 17 as shown in Fig. 3 which receives a screw or bolt 18 which serves as a pivot for a cutter 19 actuated by the handle 20, the boss 17 preferably being located adjacent one of the pivots connecting the sections of the cone. It will be apparent from the showing in Fig. 3 that by moving the handle 20 with the thumb, the cream can be cut off level with the top of the dipper. It will be entirely within the scope of the invention to provide a spring such as shown at 21 for the purpose of keeping the cutter 19 away from the mouth of the dipper. Corresponding means can be used upon the cutter 12, or the said cutter may be so proportioned that when bent to the position shown in Fig. 1, the cutter will have sufficient resilience to be held frictionally against the pivot points in any adjusted position. It will be noted that as the arcuate cutter as shown at Fig. 1, rotates about the pivots joining the respective sections of the dipper, no distortion or bowing of the cutter will attend the opening of the dipper to discharge the contents.

What I claim is:

1. An ice cream dipper comprising component parts pivoted together at opposite points on the mouth of the dipper, complementary handles extending one from each of said parts, the point of juncture between the component parts and their respective handles being out of alinement with the axis of rotation of the component parts, the handles adapted to close the dipper when gripped.

2. An ice cream dipper comprising component parts which are pivoted at opposite points on the mouth of the dipper, complementary members one of which extends from each of said component parts, said members adapted to form a handle when gripped and resilient means interposed between said handles.

3. An ice cream dipper comprising hemiconic sections, pivots pivotally connecting the sections at two points, means for moving said sections about the pivot points, and an arcuate cutter mounted upon said pivots.

4. An ice cream dipper comprising hemiconic sections, pivots pivotally connecting the sections, means for moving the sections about the pivot, and a cutter rotatably mounted upon said pivotal connection and adapted to swing from one of said sections to the other.

5. An ice cream dipper comprising component hemiconic sections pivotally connected, and an arcuate ice cream cutter conforming to the top of the interior of one of the hemiconic sections, said cutter rotating about the pivotal connection of the sections and located within the dipper.

6. An ice cream dipper comprising component parts pivotally connected at two points, and a cutter rotatably mounted within the dipper, the cutter and component parts of the dipper having the same pivotal points.

7. An ice cream dipper comprising component parts pivotally connected, a resilient cutter rotatably mounted upon the dipper, the cutter and component parts having the same pivotal connection and a thumb piece carried by the cutter adapted to engage the top of the cream.

In testimony whereof I affix my signature in presence of two witnesses.

TUCKERMAN C. FUQUA.

Witnesses:
JOHN L. FLETCHER,
W. H. WAKEFIELD.

Copies of this patent may be obtained for five cents each, by addressing the "Commissioner of Patents, Washington, D. C."